Figure 1:
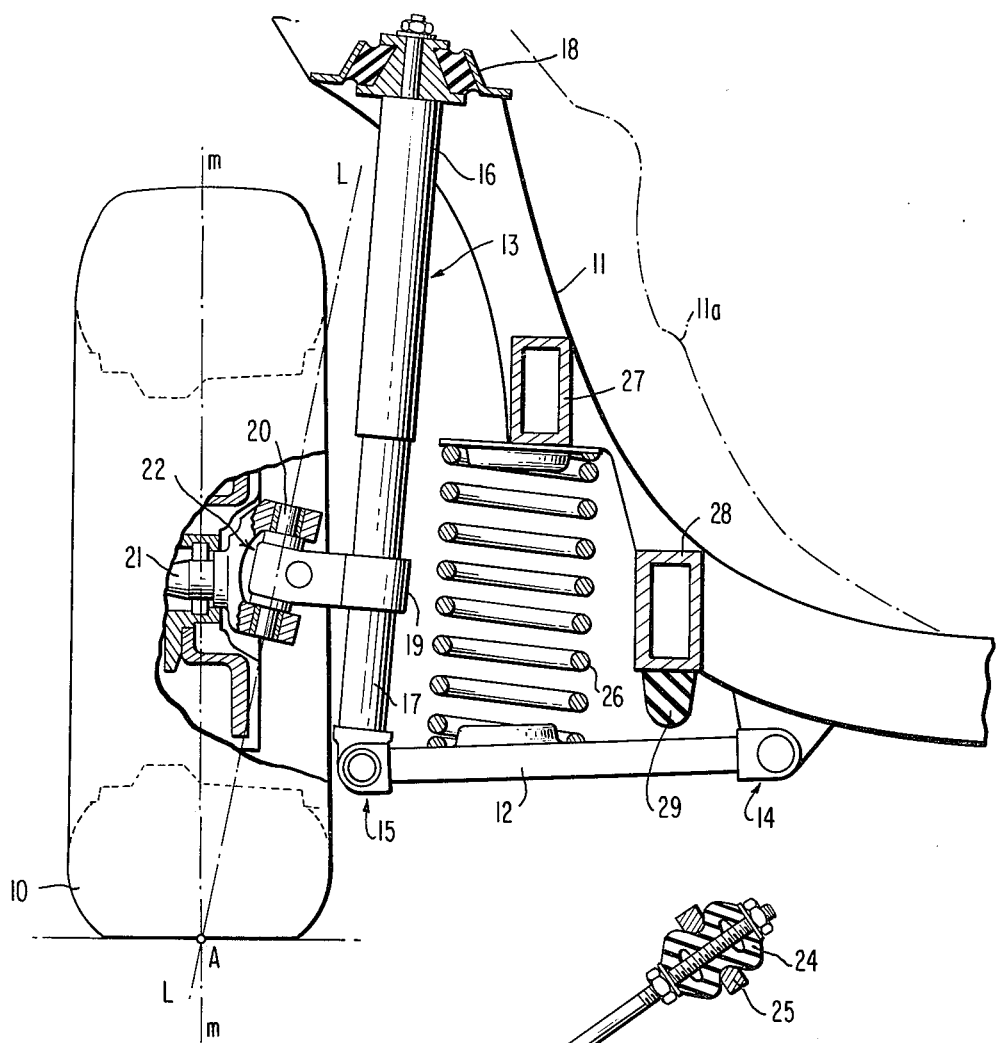

United States Patent [19]
Van Winsen

[11] 3,926,454
[45] Dec. 16, 1975

[54] SUSPENSION OF STEERABLE VEHICLE WHEELS, ESPECIALLY FRONT WHEELS OF MOTOR VEHICLES

[75] Inventor: Friedrich H. Van Winsen, Kirchheim, Germany

[73] Assignee: Daimler-Benz Aktiengesellschaft, Germany

[22] Filed: Oct. 12, 1973

[21] Appl. No.: 405,898

[30] Foreign Application Priority Data
Oct. 12, 1972 Germany.......................... 2249971

[52] U.S. Cl............................. 280/124 A; 267/20 A
[51] Int. Cl.².......................................... B60G 3/00
[58] Field of Search.................. 280/124 A, 96.2 R; 267/20 A, 21 A

[56] References Cited
UNITED STATES PATENTS

| | | | |
|---|---|---|---|
| 2,124,087 | 7/1938 | Smith | 267/20 A |
| 2,757,016 | 7/1956 | Adloff | 280/124 A |
| 2,842,230 | 7/1958 | MacPherson | 280/96.2 R |
| 2,992,015 | 7/1961 | Halford | 280/124 A |
| 3,430,977 | 3/1969 | Riehl | 280/124 A |
| 3,727,940 | 4/1973 | Hug | 280/124 A |

Primary Examiner—Philip Goodman
Assistant Examiner—John A. Carroll
Attorney, Agent, or Firm—Craig & Antonelli

[57] ABSTRACT

A suspension for steerable vehicle wheels, especially front wheels of motor vehicles, by means of a cross guide member and an essentially vertical telescopic support strut pivotally connected at its lower end with the cross guide member and pivotally supported at its upper end at the vehicle superstructure; the wheel is thereby carried by a support arm rigidly connected with the lower telescopic part of the support strut and is pivotally supported on the support arm at a distance from the axis of the support strut inside the wheel cross section about a steering axis which passes through or nearly through the point of contact of the wheel with the road surface or passes this point with a negative steering roll radius.

31 Claims, 2 Drawing Figures

U.S. Patent   Dec. 16, 1975   3,926,454

SUSPENSION OF STEERABLE VEHICLE WHEELS, ESPECIALLY FRONT WHEELS OF MOTOR VEHICLES

The present invention relates to a suspension of steerable motor vehicle wheels, especially front wheels of motor vehicles, by means of a cross guide member and of an essential vertical support strut adapted to be telescopically lengthened and shortened which is pivotally connected at the lower end thereof with the cross guide member and is pivotally supported at the upper end thereof at the vehicle superstructure.

In known wheel suspensions of this type, the essentially vertical support strut which is telescopically displaceable in itself, forms simultaneously the steering axis of the wheel. Since the support strut has to be arranged outside of the wheel, it has a relatively large distance from the center point of the wheel and determines a positive roll radius in that the steering axis intersects the road surface at a relatively large distance from the point of contact of the wheel with the road surface inside of the wheel. Such a positive steering roll radius, however, is undesirable as a rule.

It is the aim of the present invention, in contradistinction thereto, to keep this positive steering roll radius as small as possible or to let the same become zero or to enable also a negative steering roll radius without making it necessary therefor to impart an undesirably strong inclination to the steering axis of the wheel.

Accordingly, the present invention essentially consists in that the wheel is carried by a support arm rigid with the lower telescopic part of the support strut or essentially rigidly connected therewith and is pivotally supported at a distance from the axis of the support strut on the inside of the wheel cross section at the support arm about a steering axis which passes through or nearly through the point of contact of the wheel on the road surface or passes past this point of wheel contact with a negative steering roll radius.

The force to be applied for purposes of steering the wheel can thereby be kept small so that an easy steering is made possible thereby. Simultaneously therewith, a particularly space-saving construction can be achieved since the space between the support strut arranged near the wheel and the lower guide member can be far-reachingly utilized for the vehicle superstructure body.

Preferably, the steering axis of the wheel passes through or nearly through the upper support point of the support strut arranged close to the wheel, which support point is preferably disposed above the wheel.

A so-called spring leg or hydropneumatic spring leg is preferably used as support strut. As a result thereof, a particularly simple and narrow construction can be achieved. The spring leg or the hydropneumatic spring leg can simultaneously serve as shock absorber. It may also be provided possibly as the only spring. Preferably, however, a coil spring or a similar spring is additionally provided which is supported at its lower end at the cross guide member on the side of the support strut inwardly of the wheel and is supported at its upper end essentially below the upper support point of the support strut, for example, at approximately half the length thereof at the vehicle superstructure. The coil spring can be dimensioned relatively small as additional spring.

The support strut and cross guide member are preferably supported at the vehicle superstructure by means of rubber elements whereby the support of the cross guide member in the vehicle longitudinal direction may take place by an inclined strut which, in its turn, is elastically supported.

Accordingly, it is an object of the present invention to provide a suspension for steerable vehicle wheels, especially front wheels of motor vehicles, which avoids by simple means the aforementioned shortcomings and drawbacks encountered in the prior art.

Another object of the present invention resides in a suspension for the steerable vehicle wheels which minimizes the positive steering roll radius resulting therefrom.

Another object of the present invention resides in a wheel suspension of the type described above which makes it possible to keep the positive steering roll radius as small as possible without requiring an undesirably large inclination of the steering axis of the wheel.

A still further object of the present invention resides in a wheel suspension for the steerable wheels of motor vehicles which results in an easy steering action as well as in a space-saving construction.

Still another object of the present invention resides in a wheel suspension of the type described above which is relatively simple in structure, utilizes few parts and results in a simple and narrow overall construction.

Figure 2:
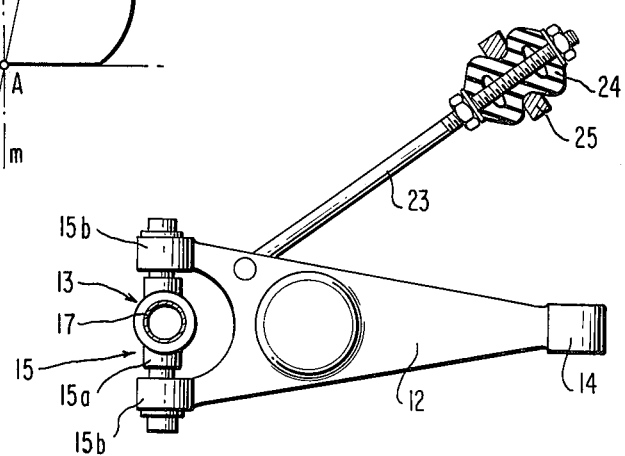

These and other objects, features and advantages of the present invention will become more apparent from the following description when taken in connection with the accompanying drawing which shows, for purposes of illustration only, one embodiment in accordance with the present invention, and wherein:

FIG. 1 is a vertical cross-sectional view through a wheel suspension according to the present invention; and FIG. 2 is a plan view on the support of the lower cross guide member by means of an inclined strut.

Referring now to the drawing wherein like reference numerals are used throughout the two views to designate like parts, the vehicle wheel 10, especially a front wheel of a motor vehicle, is suspended at the vehicle superstructure 11 by means of a lower cross guide member 12 and a support strut 13 which is connected with the cross guide member 12, itself pivotally connected at the vehicle superstructure 11 in a joint 14, preferably under interposition of rubber, hinge-like by means of a hinge 15 and corner-rigid or practically corner-rigid in a horizontal plane. The cross guide member 12 is constructed for this purpose fork-shaped at its end near the wheel in that it surrounds fork-like the lower joint eye 15a of the support strut 13 by means of its joint eyes 15b and is connected therewith by a joint bolt. Possibly, rubber bushes with slight yieldingness may also be arranged in the joint 15.

The support strut 13 is constructed, for example, as "spring leg" or as hydropneumatic spring and includes an upper sleeve-shaped telescopic part 16 as well as a lower tubularly shaped telescopic part 17 sliding within the sleeve-shaped telescopic part 16; the lower telescopic part 17 is constructed simultaneously as piston rod of the piston (not shown) sliding on the inside of the sleeve-shaped part 16. The piston may form a damping piston for a vibration damper and may exercise simultaneously possibly also a spring function.

By means of the upper end of the upper sleeve-shaped telescopic part 16 of the support strut 13 the latter is radially and axially elastically supported at the vehicle superstructure 11 in a rubber ring 18 of conically truncated shape so that the rubber cushion 18 acts as joint of the support strut 13.

The support strut 13 is moved as close as possible to the wheel 10 and carries on its lower telescopic part 17 a support arm 19 rigidly connected therewith, for example, welded thereto, at the outer end of which the wheel carrier 21 is pivotally supported about the steering axis L—L by means of a steering pin 20. The steering joint generally designated by reference numeral 22 and consisting of the parts 19, 20, and 21 is thereby moved as close as possible to the center axis m-m of the wheel 10 and has such an inclination that the steering axis L—L passes through the point contact A of the wheel, i.e., the point of contact between the wheel and the road surface, or passes nearly through the point A. Preferably, the steering axis L—L also extends approximately through the upper joint of the support strut 13 constituted by the rubber cushion 18.

The lower cross guide member 12 is additionally supported with respect to the vehicle superstructure 11 for the safe absorption of the longitudinal forces by an inclined strut 23, whereby the inclined strut 23 is supported by means of a rubber cushion 24 acting axially in both directions at a ring-shaped part 25 of the vehicle superstructure 11 (FIG. 2).

In addition to the support strut 13, a coil spring 26 is provided in the illustrated embodiment which is supported, on the one hand, with its lower end against the lower cross guide member 12 and, on the other, with its upper end against the vehicle superstructure 11, advantageously against a longitudinal bearer 27 thereof. A further longitudinal bearer 28 may be arranged on the vehicle inside of the coil spring 26 and may carry an abutment bumper or buffer 29 which elastically limits the upward stroke of the cross guide member 12 in relation to the vehicle superstructure 11 during the inward spring deflection of the wheel.

In lieu of a support by means of an inclined strut 23, a support of the cross guide member 12 in the longitudinal direction may also be provided in any other appropriate manner as known in the art. For example, the cross guide member 12 may be constructed fork-shaped at the end thereof on the side of the vehicle superstructure and may be supported at the vehicle superstructure with far outwardly projecting fork-arms. Also, in lieu of a forwardly directed compression strut 23, a rearwardly directed tension strut may be provided.

As a result of the arrangement of the support strut 13 near the wheel 10 and as a result of the stepped arrangement of the support strut 13 and of the coil spring 26 a particularly wide construction of the vehicle superstructure can be achieved which is wider by several centimeters per vehicle side than the heretofore known similar constructions. A similar prior art construction is indicated, for example, by the dash and dot line 11a of the vehicle superstructure.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A suspension for steerable vehicle wheels by means of a cross guide means and an essentially vertical support strut means adpated to be telescopically changed in length, said strut means being pivotally connected at its lower end with the cross guide means and being pivotally supported at its upper end at the vehicle superstructure, characterized in that said support strut means includes a lower telescopic part and an upper telescopic part, and the suspension further comprises support arm means for supporting a vehicle wheel, said support arm means being at least essentially rigidly connected with the lower telescopic part above the lower end of the strut means, and pivotal means for pivotally connecting said wheel to said support arm means, said pivotal means being connected to said support arm means entirely inside the wheel cross section at a distance from the axis of the support strut means, and said pivotal means defining a steering axis which passes at least in proximity to the point of contact of the wheel with the road surface and at least through the pivotal support at the upper end of said strut means such that the steering axis extends essentially within the wheel cross-section and said steering axis intersects the axis of the strut means at an acute angle at the pivotal support at the upper end of said strut means, wherein said cross-guide means is pivotally connected to the lower end of said strut means below said pivotal means and outside the wheel cross-section.

2. A suspension according to claim 1, characterized in that the steering axis passes through the point of contact of the wheel with the road surface.

3. A suspension according to claim 1, characterized in that the steering axis passes past the point of contact of the wheel with the road surface with a negative steering roll radius.

4. A suspension according to claim 1, characterized in that the vehicle wheels are front wheels of motor vehicles.

5. A suspension according to claim 1, characterized in that the upper support point of the support strut means is disposed above the wheel.

6. A suspension according to claim 5, characterized in that the support strut means is constructed as spring leg.

7. A suspension according to claim 6, characterized in that the support strut means is constructed as hydropneumatic spring.

8. A suspension according to claim 6, characterized in that the cross guide means operatively connected with the support strut means in a hinge-like and corner-rigid manner in a horizontal plane is supported at the vehicle superstructure with limited yieldingness about an essentially vertical axis utilizing elastic support means.

9. A suspension according to claim 8, characterized in that the cross guide means is supported with respect to the vehicle superstructure about a substantially vertical axis by an inclined strut means supported in an elastic cushion means.

10. A suspension according to claim 9, characterized in that the essentially vertical support strut means is supported at its upper end with universal yieldingness at the superstructure by elastic cushion means.

11. A suspension according to claim 10, characterized in that a spring means is provided for the spring support of the wheel which is supported at its lower end on the cross guide means inwardly of the support strut means and at its upper end essentially below the upper support point of the support strut means at the vehicle superstructure.

12. A suspension according to claim 11, characterized in that the spring means is supported with its upper end at the vehicle superstructure essentially at about half the length of the support strut means.

13. A suspension according to claim 11, characterized in that the spring means is a coil spring.

14. A suspension according to claim 11, characterized in that a bumper means is arranged between the spring means and the pivotal connection of the cross guide means at the vehicle superstructure for the limitation of the stroke of the cross guide means.

15. A suspension according to claim 14, characterized in that the spring means and the stroke-limiting bumper means are supported at longitudinal bearers of the vehicle superstructure.

16. A suspension according to claim 15, characterized in that the steering axis passes through the point of contact of the wheel with the road surface.

17. A suspension according to claim 15, characterized in that the steering axis passes past the point of contact of the wheel with the road surface with a negative steering roll radius.

18. A suspension accordiing to claim 15, characterized in that the vehicle wheels are front wheels of motor vehicles.

19. A suspension according to claim 1, characterized in that the support strut means is constructed as spring leg.

20. A suspension according to claim 1, characterized in that the support strut means is constructed as hydropneumatic spring.

21. A suspension according to claim 1, characterized in that the cross guide means operatively connected with the support strut means in a hinge-like and corner-rigid manner in a horizontal plane is supported at the vehicle superstructure with limited yieldingness about an essentially vertical axis utilizing elastic support means.

22. A suspension according to claim 1, characterized in that the cross guide means is supported with respect to the vehicle superstructure about a substantially vertical axis by an inclined strut means supported in an elastic cushion means.

23. A suspension according to claim 1, characterized in that the essentially vertical support strut means is supported at its upper end with universal yieldingness at the superstructure by elastic cushion means.

24. A suspension according to claim 1, characterized in that a spring means is provided for the spring support of the wheel which is supported at its lower end on the cross guide means inwardly of the support strut means and at its upper end essentially below the upper support point of the support strut means at the vehicle superstructure.

25. A suspension according to claim 24, characterized in that the spring means is supported with its upper end at the vehicle superstructure essentially at about half the length of the support strut means.

26. A suspension according to claim 24, characterized in that the spring means is a coil spring.

27. A suspension according to claim 24, characterized in that a bumper means is arranged between the spring means and the pivotal connection of the cross guide means at the vehicle superstructure for the limitation of the stroke of the cross guide means.

28. A suspension according to claim 27, characterized in that the spring means and the stroke-limiting bumper means are supported at longitudinal bearers of the vehicle superstructure.

29. A suspension according to claim 1, wherein said pivotal means includes a wheel carrier means for rotatably carrying said wheel and a steering pin pivotally connecting said wheel carrier means to the end of said support arm means.

30. A suspension according to claim 1, wherein said pivotal means is inclined to provide said steering axis extending through the point of contact of the wheel with the road surface.

31. A suspension according to claim 1, wherein said pivotal means is connected to the end of said support arm means inside the wheel cross section as close as possible to the center axis of the wheel, said center axis being parallel to the wheel cross section.

* * * * *